Oct. 6, 1936.      R. W. HENNINGS      2,056,671
BEARING BORING APPARATUS
Filed March 13, 1934
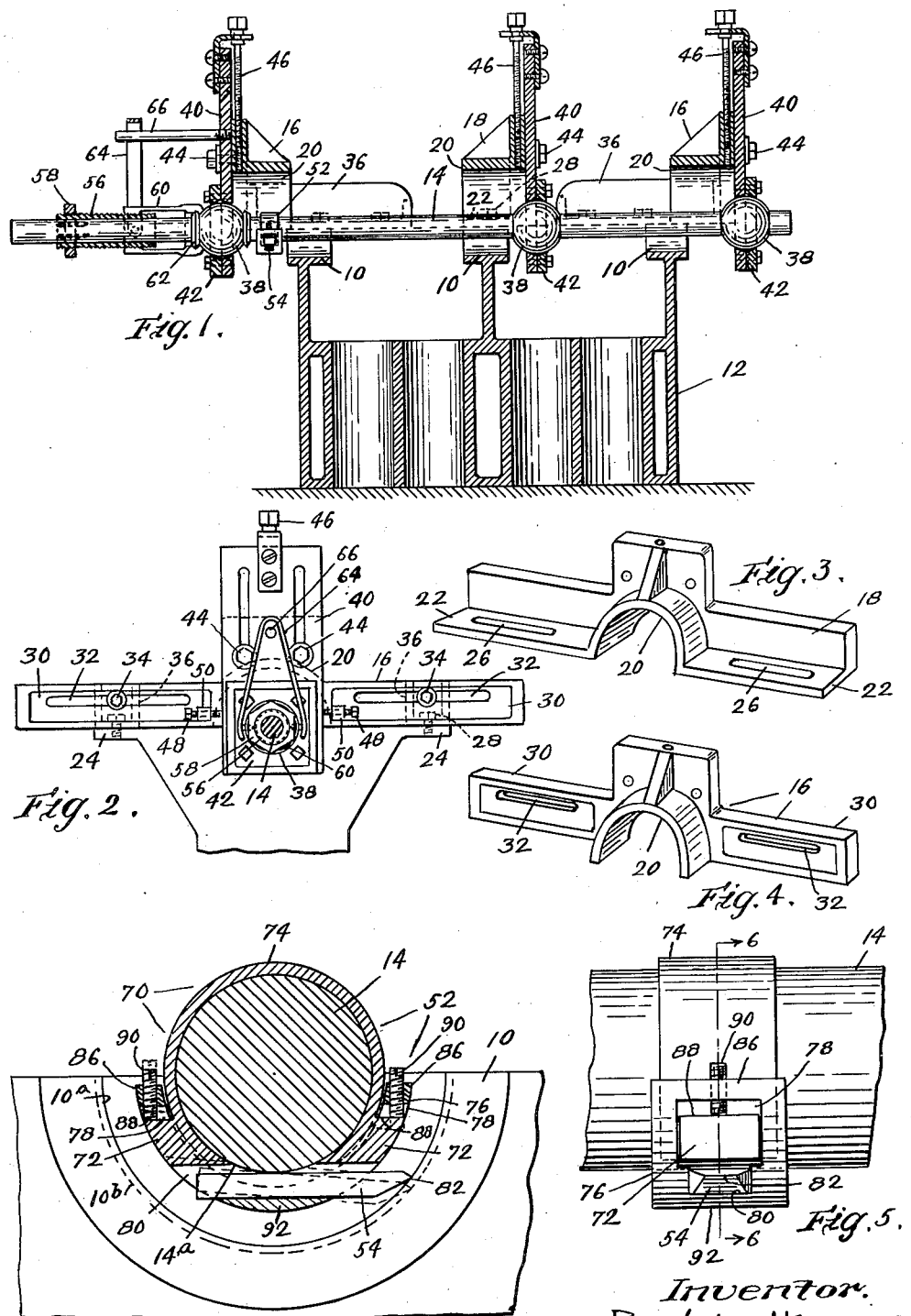

Patented Oct. 6, 1936

2,056,671

UNITED STATES PATENT OFFICE 2,056,671

BEARING BORING APPARATUS

Ralph W. Hennings, Farmington, Maine

Application March 13, 1934, Serial No. 715,310

7 Claims. (Cl. 77—58)

This invention relates to apparatus for boring and sizing shaft bearings and is particularly concerned with, although not necessarily restricted to, boring and sizing the crank shaft bearings of automobiles or internal combustion engines to fit the shaft after the bearings have been re-babbitted or renewed.

Bearing boring apparatus usually includes a boring bar or shaft which is supported rotatably in the axis of the bearings and has a cutter thereon which is rotated by the boring bar in cutting engagement with the bearing.

One of the objects of the present invention is the provision of a cutter support or head wherein the adjustment of the cutter, or the amount of cut that the tool is to make, can be readily and accurately set and, if desired, measured prior to making the cut.

A further object is the provision of a cutter support wherein the cutter or cutting tool is clamped against the surface of the cylindrical boring bar and extends tangentially thereof and the radial distance of the cutting edge of the tool to the axis of the boring bar, which determines the diameter of the crank shaft bearing, is varied by rocking the tool on the boring bar and clamping it in any set adjustment.

Another object of the invention is the provision of improved adjustable supports for positioning the boring bar coaxially with the bearings and for supporting it rotatably and longitudinally movably in position.

A yet further object is generally to improve the construction and operation of bearing boring apparatus.

Fig. 1 is a sectional elevation through the vertical longitudinal axis of an internal engine cylinder block with the boring apparatus of the present invention in position thereon.

Fig. 2 is an end view of Fig. 1.

Fig. 3 is a perspective view of an intermediate bar-support.

Fig. 4 is a perspective view of an end bar-support.

Fig. 5 is a side elevation of the cutter support.

Fig. 6 is a section taken along line 6—6 of Fig. 5.

The invention is herein illustrated for the purpose of boring or finishing the crank-shaft bearings 10 of an internal combustion engine cylinder and crank case block 12 having four cylinders and three bearings although the number of cylinders and bearings is of no importance to the present invention.

A cylindrical boring bar 14 is extended coaxially of the bearings 10 and is supported rotatably by end supporting yokes 16 and an intermediate yoke 18. All yokes have the central arches 20 within which the cutter head and its tool are adapted to rotate at times. The intermediate yoke has oppositely directed feet 22 which rest upon the opposed flanges 24 of the cylinder block, the feet having slots 26 therethrough through which bolts 28 are passed to clamp the yoke to the block, the slots being elongated to permit the yoke to be positioned in line with the bearing axis. The end yokes 16 have opposed arms 30 provided with longitudinally extended slots 32 through which bolts 34 are passed and are screwed into the ends of channel shaped blocks 36 secured on and adjustable lengthwise of the cylinder block flanges 24. All yokes are long enough for clamping to the flanges of engines having large differences in crank case width. The boring bar 14 is rotatable and movable axially in self-aligning spherical bearings 38 carried by and disposed between plates 40 and bearing caps 42 secured removably to said plates, said plates being secured to the yokes 16 and 18 by bolts 44 located in vertically elongated slots in said plates, accurate vertical positioning of the plates being effected by adjusting screws 46 and lateral adjustment being effected by adjusting screws 48 bearing against the opposite sides of the plates and screw-threaded in ears 50 of the yokes.

A cutter head 52 carrying a cutter blade or tool 54 is clamped to the boring bar and is rotated and advanced by the bar into cutting engagement with the bearings 10. While but one cutter head is here shown on the bar, more can be provided if desired.

The boring bar is advanced axially at the same time it is rotated by an externally screw-threaded feed sleeve 56 held releasably in clamping engagement with the bar in any selected position axially of said bar by a nut 58 which compresses the longitudinally slotted end of the sleeve into frictional engagement with the bar. Said feed sleeve is screw-threaded into one end of a vertically split two-part collar 60, the other end of which surrounds and is engaged with an outstanding flange 62 of the end bearing 38 and thereby is held from axial displacement. The two halves of the collar are retained removably in assembled position in engagement with the feed sleeve by an inverted U-shaped spring clip 64, the free ends of which bear inwardly against the parts of and are anchored in the collar so that it can not rotate, rotation of the clip being prevented by the post 66 interposed between the legs of the clip and removably screw-threaded into the plate 40. After one cut has been taken the boring bar may be rapidly returned to the beginning of a second cut by spreading apart the two halves of the collar sufficiently to disengage the feed sleeve and then pulling the bar back. The ends of the bearing can be machined by removing the post 66, so that the collar 60 can rotate on the flange 62 with the rotation of the boring bar and cutter without advancing the cutter head axially. The cutter can be set to remove the desired depth of material by a sufficient rotation of the feed sleeve 56, the pitch of the screw threads thereof being known.

The cutter head 52 is illustrated in detail in Figs. 5 and 6. Said head includes a sleeve 70 which is axially movable on the boring bar into any desired position in which it is thereupon clamped to the bar. The sleeve is of substantial axial length so that it has a good bearing on the bar and preferably has a resilient grip on the bar, since the sleeve is not circumferentially continuous. The sleeve is provided with enlarged confronting heads 72 and a reduced or thinner intermediate cylindrical section 74. The tops of the heads are terminated under the periphery of the boring bar so that a peripheral portion 14a of the cylindrical bar protrudes beyond and between said heads in the side opening of the sleeve between the heads. A semi-cylindrical yoke or cradle 76 overlies the protruding portion 14a and has slots or apertures 78 in its ends in which the heads 72 of the sleeve are loosely located. Said yoke has a transverse slot or groove 80 in which the cutter blade or tool 54 of any suitable character is loosely seated. As herein illustrated the tool comprises a straight rectangular bar having flat sides and a cutting end 82 of suitable character. The yoke has integral bridges 86 which overlie the flat back faces 88 of the sleeve heads 72 and clamping screws 90 are screw-threaded in said bridges and bear upon said flat faces thereby drawing the yoke and the cutting tool toward the boring bar and, when tightly set up, clamping the cutting tool 54 between the bottom wall 92 of the yoke and the exposed portion of the cylindrical boring bar. The same clamping action also secures the cutter head against rotation and axial movement on the boring bar. Thus the cutting end 82 of the cutting tool 54 is held secured in extended position, tangentially on the boring bar, to take a cut in the bearing portion 10a of the bearing 10. The diameter of the cut, that is to say, the radial distance of the cutting edge 82 from the axis of the boring bar, can be varied easily and accurately by backing-off one screw 90 and screwing down the opposite screw. If, for instance, after the surface 10a has been bored, it is desired to take another cut, say to the dotted surface 10b, the left hand screw 90, Fig. 6, is backed-off and the right hand screw is advanced. This operation causes the cutter 54 to rock on the exposed portion 14a of the boring bar and to advance or roll on the boring bar toward the left so that the point of contact between the tool and the bar is moved away from the cutting edge 82 of the tool. Thus the cutting end of the tool is caused to project farther beyond the axis of the bar and the radial distance of the cutting edge from the axis of the bar thereby is increased. This is apparent from an inspection of the full and dotted line positions of the cutter head and the tool. If the radial distance is to be shortened the reverse operation is taken. The adjustment of the tool as above described can be made without danger of the tool slipping in the head since the two screws alternately can be backed-off and screwed up by small amounts. The position of the cutting edge of the tool can be roughly obtained initially by loosening the screws and sliding the tool into approximate position and obtaining final accurate positioning as above described. The amount of a cut, or the difference between any two consecutive portions of the cutting edge of the tool easily can be measured accurately.

I claim:

1. Bearing boring apparatus comprising a cutter head having a passage therethrough for a cylindrical boring bar and a transverse passage for a cutter blade, the passages being open into each other and so arranged that a peripheral portion of the boring bar is exposed in said cutter blade passage, and clamping members disposed on opposite sides of the exposed peripheral portion of the cylindrical boring bar and arranged to force the cutter blade against said exposed portion of the boring bar, said clamping members being disposed on opposite sides of the line of contact of the boring bar and cutter blade and being adjustable toward and away from the cutter blade so that by backing-off one and advancing the other clamping member the cutter blade can be rocked on the peripheral portion of the boring bar and the position of the cutting end of the cutter blade varied.

2. Bearing boring apparatus comprising a cutter head including a sleeve having a cylindrical boring bar passage therethrough and opposed free heads on opposite sides of the passage and between which the boring bar is adapted to project, a yoke disposed transversely of said bar passage having apertures in its ends adapted to receive said heads and having a cutter blade slot confronting said heads that is transverse of and opens into said boring bar passage, a cutter blade in said slot and upon the boring bar, and clamping members carried by said yoke on opposite sides of the line of engagement between said cutter blade and boring bar and each clamping member bearing on a separate one of said heads to force said yoke against said cutter blade on the boring bar and each separately adjustable toward and away from said cutter blade slot, the arrangement being such that the cutter blade can be rocked upon the boring bar by the adjustment of said clamping members to vary the cutting radius of the cutter blade.

3. Bearing boring apparatus comprising a cutter head including a clamping sleeve having free ends and an axial passage therethrough for the cylindrical boring bar, the sleeve having an opening in one side and from end to end thereof between its ends through which a part of the periphery of the boring bar is adapted to project, heads on the free ends of said sleeve on opposite sides of the side-opening, a yoke overlying said opening having a cutter blade slot which traverses the side opening and apertures in which said heads are loosely located, a cutter blade in said slot and upon the boring, and clamping screws screw-threaded in said yoke at said apertures and adapted to bear on said heads to force said yoke against said cutter blade clamp the cutter blade against the projecting peripheral portion of the boring bar and also to rock said cutter blade on the boring bar and also to force the ends of said sleeve inwardly of said axial passage.

4. Bearing boring apparatus comprising a cylindrical boring bar, a cutter head therefor including a sleeve slidable axially on said boring bar and having an opening in its side wall through which a peripheral portion of said boring bar projects, heads on said sleeve on opposite sides of and below said exposed periphery, a yoke overlying said exposed periphery and having apertures in its ends in which said heads are loosely located and a cutter blade slot which traverses said exposed periphery, a cutter blade in said slot bearing upon said exposed periphery, and clamping members engaged between said heads and the ends of said yoke and clamping said cutter blade against said boring bar, said clamping members being separately advanceable and retractable so that by advancing one and retracting the other clamping member said cutter blade can be rolled upon said boring bar and the radial distance of the cutting end of said cutter blade from the boring bar axis can be varied.

5. Bearing boring apparatus comprising a cutter head arranged for mounting on a rotatable cylindrical boring bar, said cutter head comprising a sleeve slidable axially on the bar having a blade-receiving passage and an opening through its side wall into said passage through which opening a peripheral portion of the boring bar projects and heads projecting laterally from said side wall on opposite sides of said opening below the projecting part of the boring bar, a semi-circular yoke overlying said opening and having apertures in its ends in which said heads are located loosely, said yoke having a cutter blade slot which is disposed transversely of said boring bar passage and is adapted to receive, a cutter blade in said slot bearing upon the projecting periphery of the boring bar, and clamping screws threaded in the ends of said yoke and bearing separately on said heads to clamp the cutter blade upon the boring bar.

6. Bearing boring apparatus comprising a cylindrical boring bar, a cutter head thereon, a cutter blade carried by said head extended transversely of said boring bar and bearing tangentially on the periphery thereof, and cutter blade clamping devices carried by said head and disposed on opposite sides of the line of contact of said boring bar and cutter blade and acting in a direction to force said cutter blade against said boring bar, said clamping devices being separately adjustable so that one can be advanced and the other retracted for rocking said cutter blade upon said boring bar to vary the cutting radius thereof.

7. Bearing boring apparatus comprising an adjustable cutter supporting head arranged for mounting on a rotatable cylindrical boring bar, said cutter head comprising a cutter blade supporting yoke, a cutter blade in said yoke having a flat surface adapted to be disposed transversely of and in contact with the cylindrical periphery of the bar, a clamping sleeve which has a boring bar receiving passage between its ends, the passage being laterally open between the ends so that a portion of the periphery of the bar is exposed therebetween and under the yoke, and clamping devices engaging both ends of said sleeve and said yoke on opposite sides of the boring bar and operable to force the flat surface of said cutter blade against the exposed portion of the bar and also to force the ends of the sleeve inwardly of the aperture therebetween and against opposite sides of the bar, thereby to clamp the cutter blade upon the bar, said clamping devices being separately adjustable so that by tightening one clamping device and slacking the other clamping device said cutter blade is caused to rock upon the bar and change the cutting radius of the cutter blade.

RALPH W. HENNINGS.